(12) United States Patent
Hsieh et al.

(10) Patent No.: US 8,775,737 B2
(45) Date of Patent: Jul. 8, 2014

(54) EFFICIENT CACHE MANAGEMENT

(75) Inventors: Bor-Ming Hsieh, Redmond, WA (US); Andrew M. Rogers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 153 days.

(21) Appl. No.: 12/958,674

(22) Filed: Dec. 2, 2010

(65) Prior Publication Data
US 2012/0144092 A1    Jun. 7, 2012

(51) Int. Cl.
*G06F 12/16* (2006.01)
(52) U.S. Cl.
USPC ............ 711/118; 711/129; 711/170; 711/171
(58) Field of Classification Search
USPC .................................. 711/118, 129, 170, 171
See application file for complete search history.

(56) References Cited

U.S. PATENT DOCUMENTS

| | | | |
|---|---|---|---|
| 5,537,635 A | 7/1996 | Douglas | |
| 5,581,736 A | 12/1996 | Smith | |
| 5,752,262 A | 5/1998 | Cassetti et al. | |
| 5,860,131 A | 1/1999 | Daub | |
| 6,324,633 B1 * | 11/2001 | Flake et al. ................... | 711/173 |
| 6,408,313 B1 | 6/2002 | Campbell et al. | |
| 7,454,564 B2 | 11/2008 | Roskind | |
| 2005/0010723 A1 | 1/2005 | Cho et al. | |
| 2005/0066227 A1 | 3/2005 | Chia et al. | |
| 2005/0080994 A1 * | 4/2005 | Cohen et al. ................... | 711/118 |
| 2006/0236026 A1 * | 10/2006 | Hempel ........................ | 711/103 |
| 2007/0226417 A1 | 9/2007 | Davis | |
| 2009/0172296 A1 | 7/2009 | Tsuji et al. | |
| 2009/0216945 A1 | 8/2009 | Shimada | |
| 2009/0222627 A1 | 9/2009 | Reid | |
| 2010/0287339 A1 | 11/2010 | Olszewski et al. | |

FOREIGN PATENT DOCUMENTS

| | | |
|---|---|---|
| JP | 2009-157612 | 7/2009 |
| KR | 10-0505695 | 8/2005 |

OTHER PUBLICATIONS

Bright, "Behind the Windows 7 memory usage scaremongering," downloaded from http://arstechnica.com/microsoft/news/2010/02/behind-the-windows-7-memory-usuage-scaremongering.ars, 3 pages (document marked Feb. 18, 2010, downloaded Nov. 3, 2010).
Diggs, "The Zone Manager," downloaded from http://www.thezonemanager.com/2009/03/filesystem-cache-optimizations.html, 12 pages, (document marked Mar. 26, 2009, downloaded Nov. 3, 2010).

(Continued)

*Primary Examiner* — Jae Yu
(74) *Attorney, Agent, or Firm* — John Jardine; Andrew Sanders; Mickey Minhas

(57) ABSTRACT

A method of managing memory of a computing device includes providing a first memory that can be allocated as cache memory or that can be used by a computing device component. A first memory segment can be allocated as cache memory in response to a cache miss. Cache size can be dynamically increased by allocating additional first memory segments as cache memory in response to subsequent cache misses. Cache memory size can be dynamically decreased by reallocating first memory cache segments for use by computing device components. The cache memory can be a cache for a second memory accessible to the computing device. The computing device can be a mobile device. The first memory can be an embedded memory and the second memory can comprise embedded, removable or external memory, or any combination thereof. The maximum size of the cache memory scales with the size of the first memory.

19 Claims, 7 Drawing Sheets

(56) References Cited

OTHER PUBLICATIONS

"Linux Memory Consumption," downloaded from http://www.slideshare.net/haish/linux-memory-consumption, 3 pages, (document not dated, downloaded on Nov. 3, 2010).

Momjian, "PostgreSQL Hardware Performance Training," downloaded from http://momjian.us/main/writings/pgsql/hw_performance/, 7 pages, (document not dated, downloaded on Nov. 3, 2010).

Russinovich, "Inside the Windows Vista Kernel: Part 2," *TechNet Magazine*, pp. 24-32 (Jul. 2007).

"Vista —Memory Leak" downloaded from http://www.vistax64.com/general-discussion/170156-memory-leak.html, 2 pages, (forum post dated Jul. 24, 2008, downloaded on Nov. 3, 2010).

"ZFS Evil Tuning Guide," downloaded from http://www.solarisinternals.com/wiki/index.php/ZFS_Evil_Tuning_Guide#Limiting_the_ARC_Cache, 15 pages, (document not dated, downloaded on Nov. 17, 2010).

International Search Report and Written Opinion issued in PCT/US2011/061923, dated Jun. 29, 2012, 8 pages.

Examination Report from related European Patent Application No. 11845174.9, dated Feb. 17, 2014, 6 pages.

Office Action from related Chinese Application No. 201110415234.9, dated Feb. 26, 2014, 11 pages (including English Translation).

Search Report from related European Patent Application No. 11845174.9, dated Jan. 27, 2014, 3 pages.

\* cited by examiner

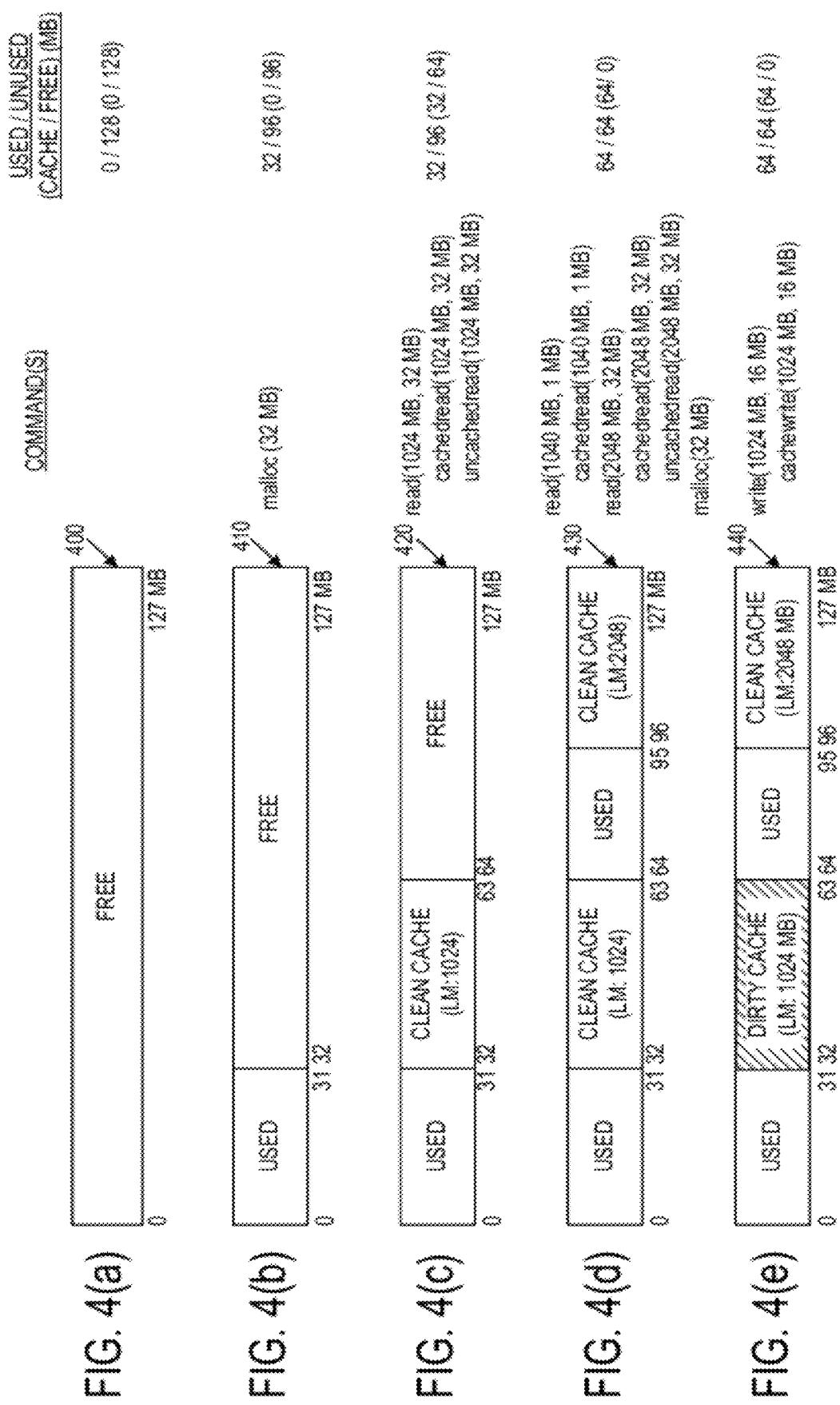

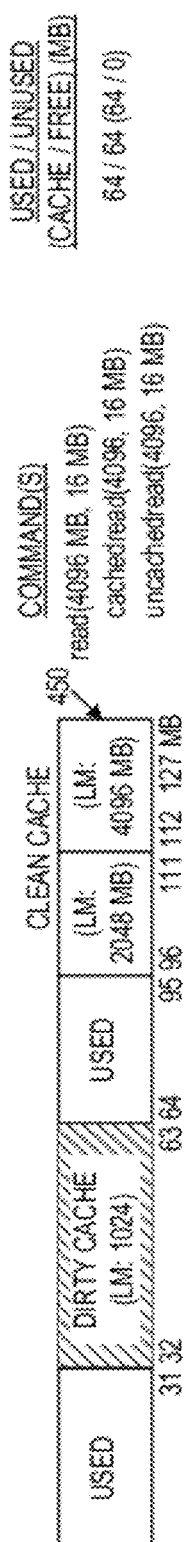
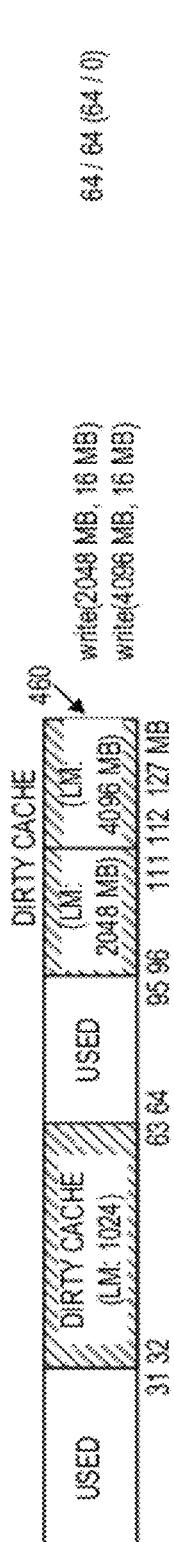
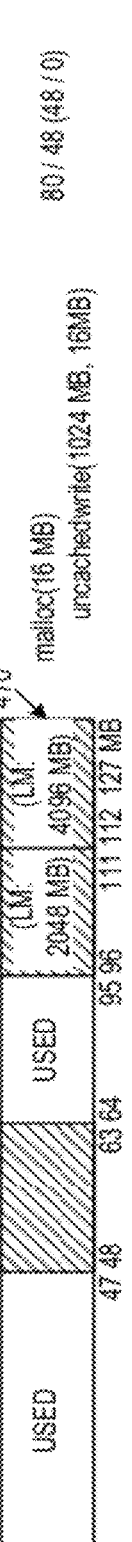
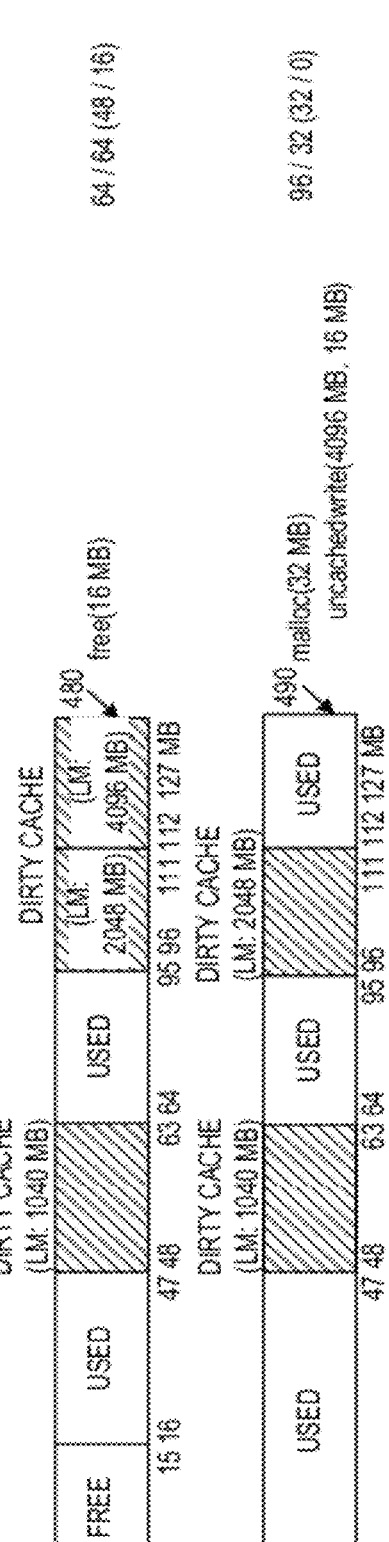
FIG. 4(f)
FIG. 4(g)
FIG. 4(h)
FIG. 4(i)
FIG. 4(j)

EFFICIENT CACHE MANAGEMENT

FIELD

The present disclosure relates to memory management in computing devices, and, more particularly, to the management of memory that can be dynamically allocated as cache memory and that can be used by computing device components.

BACKGROUND

Cache memories can improve the overall performance of a computing device by providing improved access times to larger, slower memories within or accessible to the device. However, as cache memories are generally smaller than the memories further down a memory hierarchy, they cannot hold copies of all of the contents of such lower memories. Thus, performance gains due to improved memory access times are offset by the overhead needed to swap lower memory segments in and out of cache memories.

Generally, cache memory size is fixed, either because the cache memory is a dedicated memory component (e.g., one or more dedicated memory chips or modules), or because a fixed portion of the memory space has been designated as cache memory. Increasing cache memory size can reduce the frequency at which cache load and write back operations occur, as cache miss rates generally decrease with increased cache size. However, once a cache memory is filled with lower memory contents, the cache generally cannot provide any additional memory system performance improvements. If a fixed cache memory size is made very large, the unused cache is not available to other system components, and can be wasted.

Thus, there is a need to more efficiently use cache memory such as not to limit other system components, but allow ample cache when needed.

SUMMARY

Memory management methods are disclosed herein that provide a dynamically sizeable cache in a computing device that can expand automatically in response to cache misses and contract in response to memory allocation requests by device components.

In one embodiment, a first memory of a computing device (e.g., a higher level of memory within a computing device's memory hierarchy) can be allocated as cache memory for a second memory (e.g., a level of memory below the first memory in the memory hierarchy), or for use by applications or other components of a computing device. For example, embedded RAM in a cell phone can be allocated as cache memory for a removable non-volatile flash memory card. As applications executing on the cell phone request read/write access to the memory card, the phone can dynamically expand the portion of the RAM allocated as cache in response to cache misses, if unused RAM is available. The cache can grow in response to each cache miss, and can grow to fill any unused RAM. If an application requests a portion of RAM be allocated for use by the application, and the cache has consumed all available free memory in the RAM, the phone can reallocate a portion of the cache for use by the application. Accordingly, cache size can contract in response to a memory allocation request. Thus, the cache is considered unused memory and, therefore, does not decrease an amount of memory available to application and other components of the computing device, regardless of the size of the cache.

The size of the cache scales with the size of the first memory. For example, if the size of the embedded RAM is increased by the addition of more memory components, the maximum possible size of the cache can increase accordingly.

The foregoing and other objects, features and advantages of the invention will become more apparent from the following detailed description, which proceeds with reference to the accompanying figures.

BRIEF DESCRIPTION OF THE DRAWINGS

FIGS. 4($a$)-4($j$) show memory maps of an exemplary first memory in a mobile device and the amount of used and unused memory in the first memory after the execution of various memory operations.

DETAILED DESCRIPTION

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises." Further, a reference to a "portion" of memory can refer to the entire memory or less than the entire memory. Furthermore, the term "memory segment" means a portion of memory of any size and can refer to a memory block or page. Moreover, terms modified by the word "substantially" include quantities or amounts that vary slightly from the meaning of the unmodified term. For example, memory in which "substantially all" of the memory has been allocated as cache memory can comprise a relatively small amount of memory that has not been allocated as cache memory. For instance, such a memory can comprise segments that are too small to be allocated as cache memory in response to cache misses. The amount of memory not allocated as cache memory be on the order of ones of bits, kilobytes or even megabytes, either in individual memory segments or taken together. Moreover, the terms "allocating" and "reallocating" both refer to designating a portion of memory for a different purpose, and are used interchangeably in this regard.

Figure 1:
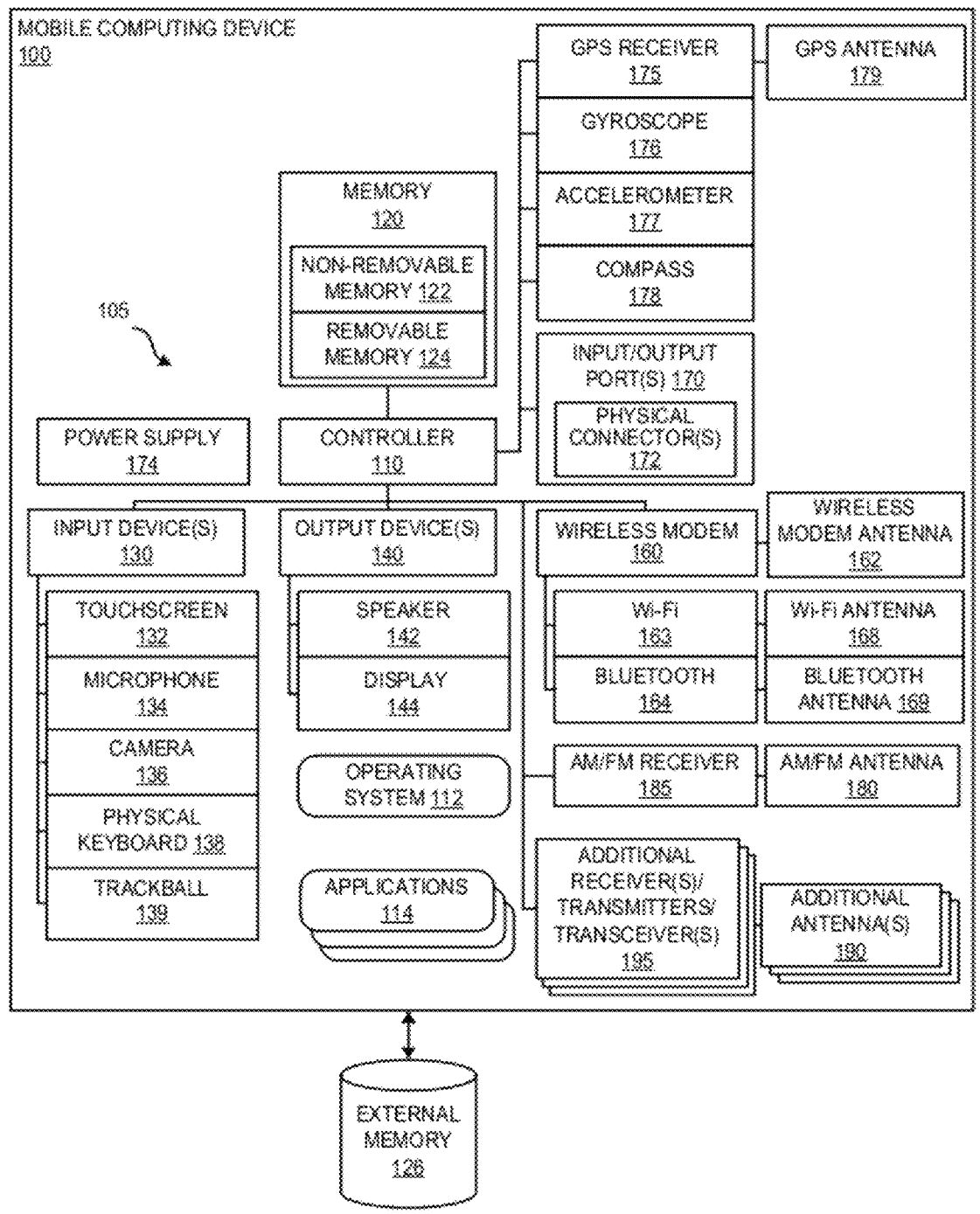
FIG. 1 is a block diagram of an exemplary mobile device.

FIG. 1 is a block diagram of an exemplary mobile device 100 that can be used to perform any of the methods described herein. The mobile device 100 can be any mobile computing device such as a smartphone; laptop, tablet or netbook computer; or the like. The mobile device 100 can include a variety of optional hardware and software components 105. Any component 105 in the mobile device 100 can communicate with any other component, although not all connections are shown, for ease of illustration.

The illustrated mobile device 100 can include a controller or processor 110 (e.g., signal processor, microprocessor, ASIC, or other control and processing logic circuitry or software) for performing such tasks as signal coding, data processing, input/output processing, power control, and/or other functions. An operating system 112 can control the allocation and usage of the components 105 and support for one or more application programs 114. The application programs can include common mobile computing applications (e.g., email applications, calendars, contact managers, web browsers, messaging applications) or any other computing application.

The illustrated mobile device 100 can include memory 120. Memory 120 can include non-removable memory 122 and/or removable memory 124. The non-removable or embedded memory 122 can include RAM, ROM, flash memory, a hard drive, or other well-known memory storage technologies. The removable memory 124 can include flash memory cards (e.g., SD (Secure Digital), miniSD, microSD, SDHC (SD High Capacity) or SDXC (SD Extended Capacity) cards), memory sticks, a Subscriber Identity Module (SIM) card, which is well known in GSM (Global System for Mobile Communication) systems, or other well-known memory storage technologies, such as "smart cards." The memory 120 can be used for storing data and/or code for running the operating system 112 and the applications 114. Example data can include web pages, text, images, sound files, video data or other data sets to be sent to and/or received from one or more network servers or other devices by the mobile device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 120 can also have access to external memory 126, which can comprise, for example, an external hard drive or any memory store accessible to the mobile device 120 over a wired or wireless network connection. Any portion of the memory 120 can be utilized by the mobile device 100 as cache memory.

The mobile device 100 can support one or more input devices 130, such as a touch screen 132, microphone 134, camera 136, physical keyboard 138 and/or trackball 139 and one or more output devices 140, such as a speaker 142 and a display 144. Other possible output devices (not shown) can include piezoelectric or other haptic output devices. Some devices can serve more than one input/output function. For example, touchscreen 132 and display 144 can be combined in a single input/output device. Any of the input devices 130 or the output devices 140 can be internal or external to the mobile device 100.

A wireless modem 160 can be coupled to a wireless modem antenna 162 and can support two-way communications between the mobile device 100 and external devices, as is well understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the mobile device and a public switched telephone network (PSTN).

The mobile device 100 can further include at least one input/output port 170 (which can be, for example, a USB port, IEEE 1394 (FireWire) port, and/or RS-232 port) comprising physical connectors 172, a power supply 174, a satellite navigation system receiver such as a GPS receiver 175, gyroscope 176, accelerometer 177 and compass 178. The GPS receiver 175 can be coupled to a GPS antenna 179. The mobile device 100 can additionally include an AM/FM antenna 180 coupled to an AM/FM receiver 185 for receiving radio signals broadcast by an AM/FM radio signal transmitter. The mobile device 100 can further include one or more additional antennas 190 coupled to one or more additional receivers, transmitters and/or transceivers 195 to enable various additional functions. For example, mobile device 100 can include an additional antenna 190 coupled to an additional receiver 195 configured to receive and process a digital audio radio service (DARS) signal for output at the mobile device 100 or an attached accessory.

Although the various antennas are shown as separate hardware components of the mobile device 100, they can be incorporated into other components. For example, GPS antenna 179 can be incorporated into the GPS receiver 175. In addition, antennas shown as separate in FIG. 1 can be implemented as a single antenna. For example, the AM/FM antenna 180 and the GPS antenna 179 can be a single antenna shared by GPS receiver 175 and AM/FM receiver 185. Furthermore, multiple antennas can be connected to a switch to allow a component to be coupled to one of several antenna sources, or to more than one antenna source. For example, the AM/FM receiver 185 can be connected to a switch (not shown) that allows either the AM/FM antenna 180 or an antenna external to the mobile device 100 to be used as the AM/FM receiver antenna source. The switch can also be configured to allow both the AM/FM antenna 180 and an external antenna, or multiple antennas to be simultaneously used as antenna sources for the AM/FM receiver 185. The illustrated components 105 are not required or all-inclusive, as any components can be deleted and other components can be added.

Figure 2:
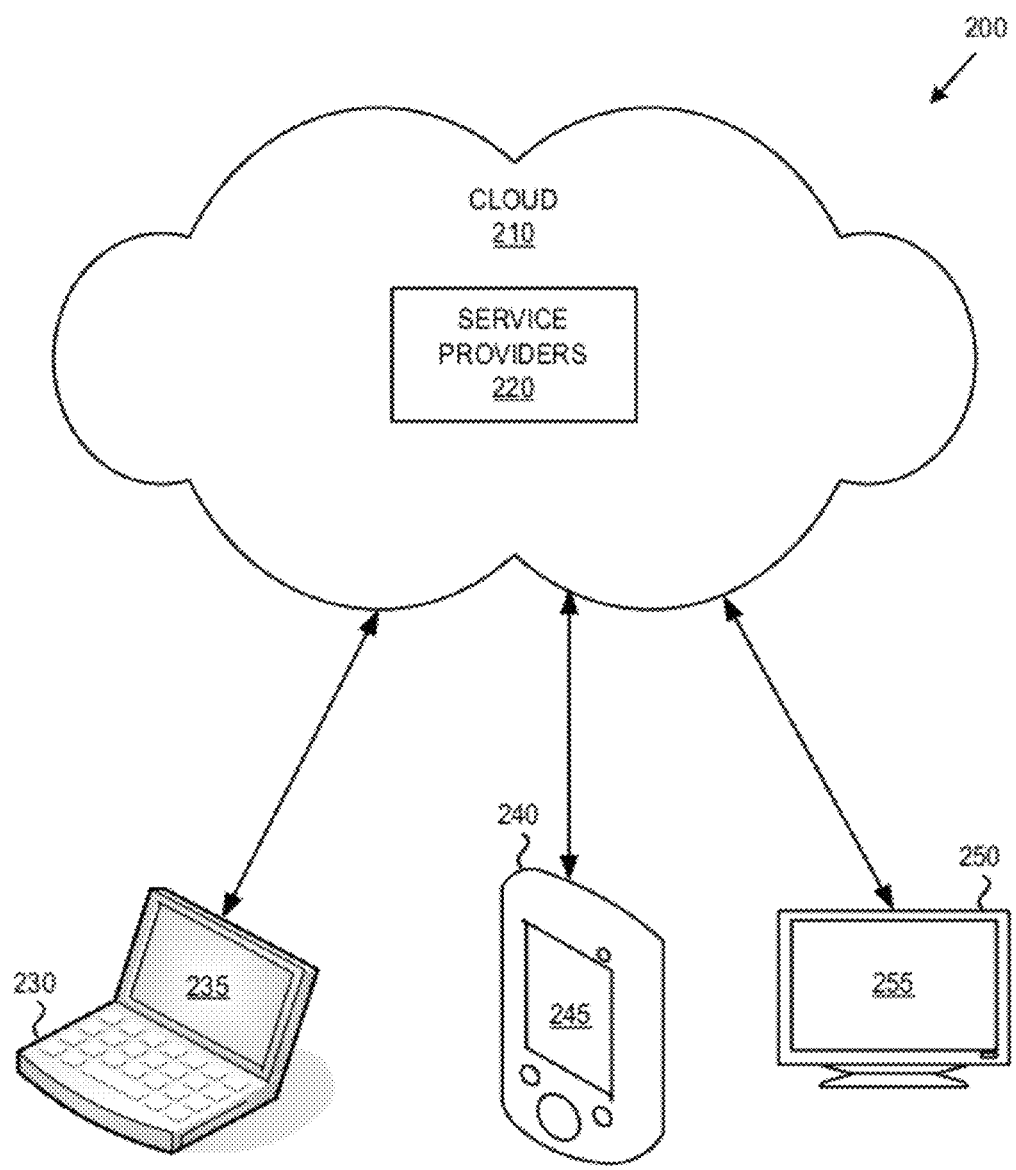
FIG. 2 is a block diagram of a cloud computing environment in which the exemplary mobile device of FIG. 1 can operate.

FIG. 2 illustrates a generalized example of a suitable implementation environment 200 in which the described embodiments, techniques, and technologies may be implemented and in which any of the mobile device and computing devices described herein can operate.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., memory management, processing user input and presenting a user interface) can be performed on local computing devices (e.g., connected devices 230, 240, 250) while other tasks (e.g., storage of data to be used in subsequent processing, accessing a memory storage located within the cloud) can be performed in the cloud 210.

In example environment 200, the cloud 210 provides services for connected devices 230, 240, 250 with a variety of screen capabilities. The connected devices 230, 240, 250 can be any of the mobile devices and computing devices described herein. Connected device 230 represents a device with a computer screen (e.g., a mid-size screen 235). For example, connected device 230 could be a personal computer such as desktop computer, laptop, notebook, netbook or the like. Connected device 240 represents a mobile device with a mobile device screen 245 (e.g., a small-size screen). For example, connected device 240 could be a mobile phone, smart phone, personal digital assistant, tablet computer or the like. Connected device 250 represents a device with a large screen 255. For example, connected device 250 could be a television with Internet connectivity, or a television connected to another device capable of connecting to the cloud such as a set-top box, gaming console or the like. One or more of the connected devices 230, 240, 250 can include touch screen capabilities. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), social networking and website hosting. The service providers can host online marketplaces offering wide varieties of goods and services such as software applications and upgrades and media content which can be obtained by users with or without purchase and for download from the cloud or delivery through postal mail. The service providers 220 can also provide network-accessible memory that any of the connected devices 230, 240, 250 can use as a second memory.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and/or devices (e.g., for the connected devices 230, 240, 250 and/or their respective users).

Although a mobile device 100 has been described in detail, it is not necessary that the methods described herein be performed by a mobile device. The methods described herein can be performed with any computing device employing cache memories, including those not generally considered "mobile" devices such as desktop computers, servers and the like. Such "non-mobile" computing devices can operate in the computing environment of FIG. 2.

Figure 3:
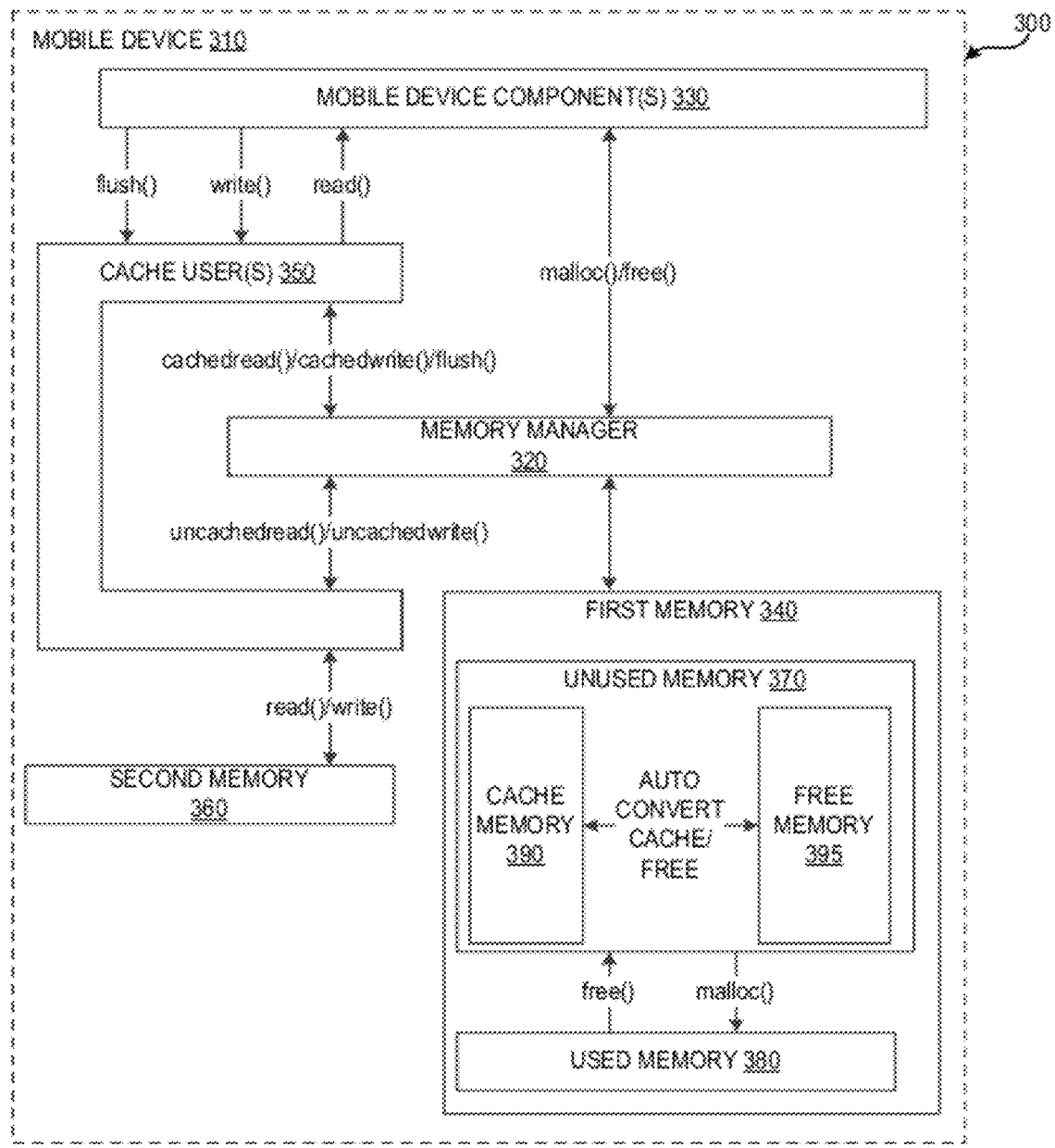
FIG. 3 is a block diagram of an exemplary memory system of a mobile device.

FIG. 3 is a block diagram of an exemplary memory system 300 of a mobile device 310 employing any of the methods described herein. The memory system 300 comprises a memory manager 320, one or more mobile device components 330, a first memory 340, one or more cache users 350 and a second memory 360.

First memory 340 comprises unused memory 370 and used memory 380. Used memory 380 comprises first memory 340 that has been allocated for use by a component 330 such as the operating system, other software applications or hardware components. Thus, the used memory can be used for storing computer-executable instructions, program data or any other data that can be readily and quickly accessed by a controller or processor of the mobile device. Unused memory 370 comprises free memory 395 and cache memory 390. Free memory 395 is first memory 340 that can be allocated as either cache memory 390 or used memory 380, but which has not yet been allocated. Cache memory 390 is first memory 340 that has been allocated for use as cache for second memory 360.

Various features can be used to distinguish the first memory 340 from the second memory 360. For example, the first memory 340 can refer to a memory that resides at a higher level within a memory hierarchy, is smaller in size, is physically located closer to any mobile computing device processors, and/or has faster memory access times (e.g., read/write times) relative to the second memory 360. Other features can be used to distinguish the first memory 340 from the second memory 360 as well.

A mobile device memory hierarchy can comprise any combination of the removable, non-removable and external memories discussed above in regard to FIG. 1. In one embodiment, the first memory 340 can be non-removable RAM (e.g., SRAM or DRAM) and the second memory 360 can be a larger, non-removable flash memory in the hierarchy. In another embodiment, the second memory 360 can be removable flash memory such as an SD card or an external memory device such as a USB hard drive or a network-accessible memory store. The first memory 340 and the second memory 360 can each comprise multiple memory components or devices. For example, the first memory 340 can comprise multiple stand-alone RAM chips or modules embedded in the mobile device, or RAM circuitry integrated into any device processor or controller. Furthermore, the first and second memories can each comprise multiple levels of memory within the memory hierarchy. For example, a first memory can comprise RAM circuitry integrated into a processor and stand-alone RAM external to the processor, and the second memory 360 can comprise a removable SD card and a USB external hard drive attached to the mobile device 310.

Further, the memory hierarchy can comprise more than two levels and a given level of memory within the hierarchy can act either as a first memory 340 or as a second memory 360. That is, a given level of memory can be a first memory with respect to one level of memory, and a second memory with respect to another level of memory. For example, in a memory hierarchy comprising 256 MB of embedded RAM, 16 GB of embedded flash memory and 1 TB of external hard drive storage, the embedded RAM can act as a first memory to the embedded flash memory, and the embedded flash memory can act as a first memory to the external hard drive. Accordingly, the methods described herein can be utilized to implement multiple cache memories in a memory system.

The memory manager 320 can be implemented as part of the operating system of the mobile device 310 and is responsible for, in part, managing the first memory 340 for use as cache memory 390 and for use by the mobile device components 330. The memory manager 320 can interact directly with the cache users 350 and directly or indirectly (through the cache users 350) with the mobile device components 330. The memory manager 320 can keep track of how each first memory segment is being utilized or has been allocated (e.g., free memory, used memory, clean cache or dirty cache). In addition, the memory manager 320 can allocate free first memory 395 as used memory 380, and reallocate used memory 380 as free memory 395, in response to commands received from a component 330. Further, the memory manager 320 can automatically allocate free first memory 395 as cache memory 390 and vice versa in response to cache read and write commands received from a cache user 350, and instruct a cache user 350 to perform access the second memory 360.

The cache users 350 comprise file systems, device drivers or any other mobile device component that utilizes cache memory to improve performance of the second memory 360. The cache users 350 can act as an intermediary between the memory manager 320 and components 330, and between the memory manager 320 and the second memory 360. For example, a cache user 350 can issue cache read and write commands to the memory manager 320 in response to receiving commands from a component 330. A cache user 350 can also issue read and write command to the second memory 360 in response receiving commands from the memory manager

320. A cache user 350 can be a software or hardware component of the memory system 300, and can be located internal or external to the mobile device 310. For example, a cache user 350 can be a flash memory manager internal to the mobile device 310 that manages removable and/or non-removable flash memory, a device driver for an external memory device, or a file system manager as part of an external memory device.

The mobile device components 330 can comprise one or more of the mobile device hardware of software components 105 described above as well as additional hardware or software components not depicted in FIG. 1.

The memory manager 320 can keep track of the status of each first memory segment, the status indicating whether the segment is "free," (available for allocation as cache or for use by a device component 330), "used" (allocated for use by a component 330), "clean cache" ("clean"), or "dirty cache" ("dirty"). A first memory segment designated as "clean" is a first memory segment that has been allocated as cache memory, and whose contents match those of the corresponding second memory segment. The memory manager 320 can designate a first memory segment as "clean" upon allocating a segment of free memory 395 as cache memory 390. A "clean" memory segment can remain clean as long as read operations are performed on the segment or until the segment is reallocated as free memory 395 or used memory 380.

A first memory segment designated as "dirty" is a first memory segment that has been allocated as cache and whose contents differ from the corresponding second memory segment. The memory manager 320 can designate a first memory cache segment as "dirty" upon execution of a write operation to a "clean" cache segment. Prior to allocating a cache memory segment as free memory or reallocating the segment to corresponding to a different second memory segment, a memory manager 320 can perform a write back operation in which the cache memory segment contents are written back to the corresponding second memory segment to synchronize the second memory 360 with the cache memory 390. The status of a cache memory segment can be changed from "dirty" to "clean" after a write back operation has been performed.

The memory manager 320 can automatically allocate cache memory 390 by converting free memory 395 to cache memory 390 in response to a cache miss, thereby dynamically increasing the amount of cache memory 390. However, increasing the size of the cache memory 390 does not decrease the amount of unused memory 370 available for use by a mobile device component 330, as unused memory 370 comprises both cache memory 390 and free memory 395. Thus, it is possible for substantially all of the free memory 395 to be automatically converted to cache memory 390 in response to cache misses. Put another way, substantially all of the unused memory 370 can be allocated as cache memory 390. Yet, at any point, an application or component can request unused memory and a portion of cache can be given up or reallocated in response thereto. Thus, memory allocation request by applications and components are given priority over cache for use of the unused memory. If the memory manager 320 receives a memory allocation request from a component 330 and no free memory is available, the memory manager 320 can reallocate a portion of the cache memory 390 sufficient as free memory 395, to satisfy the memory allocation request.

Thus, the methods described herein provide for a memory management approach in which substantially all of the unused memory 370 can be allocated as cache memory 390, without limiting the amount of first memory 340 available to the mobile device components 330. Accordingly, the size of the cache memory 390 can be dynamically increased or decreased, depending on the cache read, cache write, memory allocation and free memory commands received by the memory manager 320. As substantially all of the first memory 340 can be allocated as cache memory 390, the maximum size of the cache memory 390 scales with the size of the first memory 340. Thus, an upgrade to a mobile device 310 comprising an increase in the amount of first memory 340, for example, by adding more SDRAM memory into vacant memory module slots or by replacing an existing memory module with a higher density one, also increases the maximum size of the cache memory 390.

In one embodiment, the cache users 350, components 330, and the first memory 340 can comprise application program interfaces (APIs) presented by each of the various components to implement the memory management functionalities described herein. For example, the memory manager 320 can present to the cache users 350 an API comprising the methods, operations or functions (methods): cachedread( ), cachedwrite( ) and flush( ). The cache users 350 can present an API comprising the methods uncachedread( ) and uncachedwrite( ) to the memory manager 320 and an API comprising the methods read( ) write( ) and flush( ) to the mobile device components 330.

The API methods presented by the memory manager 320 to the components 330 can comprise the methods malloc( ) and free( ). The method malloc(size) directs the memory manager 320 to allocate the indicated amount of first memory 340 for use by the calling component 330. The method free(size) directs the memory manager 320 to free up the indicated amount of first memory 340.

The API methods presented by the cache users 350 to the components 330 can comprise the following methods with the listed parameters. The method read(second_mem_addr, bytes) returns the indicated number of second memory bytes starting at the indicated second memory address. The method write(second_mem_addr,data) writes the indicated data to the second memory starting at the indicated second memory address. The method flush( ) forces the memory manager 320 to write the contents of cache memory segments indicated as "dirty" back to the second memory 360.

The API methods presented by the memory manager 320 to the cache users 350 can comprise the following methods. The method cachedread(second_mem_addr,bytes) reads the indicated number of bytes from the portion of cache memory corresponding to the indicated second memory address. The method cachedwrite(second_mem_addr,data) writes the indicated data to the portion of cache memory corresponding to the indicated second memory address. The method flush( ) forces the memory manager 320 to write the contents of dirty cache memory segments to the second memory 360. As discussed below, the uncachedread( ) and uncachedwrite( ) methods can be invoked as part of the memory manager 320 servicing a cachedread( ) or cachedwrite( ) request.

The API methods presented by the cache users 350 to the memory manager 320 can comprise the following methods. The method uncachedread(second_mem_addr,bytes) reads the indicated number of second memory bytes starting at the indicated second memory address; and uncachedwrite(second_mem_addr,data) writes the indicated data to the second memory beginning at the indicated second memory address.

In other embodiments, the memory management functionalities described herein can be implemented with APIs comprising the methods listed above with different, more or fewer parameters, with APIs comprising a different set of methods than those listed above, or in a manner other than using APIs.

In one embodiment, the memory system 300 can service method calls issued by the mobile device components 330 as follows. Regarding a read( ) operation, a component 330 issues a read( ) command to a cache user 350. In response, the receiving cache user 350 issues a cachedread( ) command to the memory manager 320 to read the requested memory contents from cache memory 390. In response to receiving the cachedread( ) command, the memory manager 320 can first determine whether a copy of the requested second memory contents are present in the cache memory 390 (i.e., whether the cachedread( ) command results in a cache hit or miss). The memory manager 320 can keep track of which second memory segments are present in the cache memory 390 using known methods such as look-up-tables, address tags and the like. If the requested second memory contents are present in the cache memory 390 (i.e., there is a cache hit), the memory manager 320 reads the requested contents from the cache memory 390 and returns the requested contents to the calling cache user 350. The cache user 350 in turn returns the results of the read operation to the requesting component 330. The status of the cache memory segment from which cache memory contents were read does not change. Cache memory segments indicated as "clean" remain "clean," and memory blocks indicated as "dirty" remain "dirty."

If a copy of the second memory contents indicated in the cachedread( ) method do not reside in cache memory 390 (i.e., there is a cache miss) the memory manager 320 can allocate unused memory 370 as cache memory 390 to support the read operation. If there is sufficient free memory 395 available to accommodate the cachedread( ) request, the memory manager 320 can allocate a portion of the free memory 395 as cache memory 390, and issue an uncachedread( ) method call to the cache user 350 API. The uncachedread( ) method can access the second memory 360 and copy the appropriate contents of the second memory 360 to the newly allocated cache memory segment. The status of the first memory segments allocated as cache memory 390 are changed from "free" to "clean."

If there is insufficient free memory 395, the memory manager 320 can reallocate cache memory 390 to satisfy the cachedread( ) request. If there is enough clean cache available, the memory manager 320 can reallocate enough clean cache as needed to hold a copy of the second memory contents indicated in the cachedread( ) method call. The memory manager 320 can select which cache memory segment to reallocate according to various cache replacement strategies known in the art (e.g., least recently used, random). The memory manager 320 can issue an uncachedread( ) method call to the cache user 350 to read the indicated contents of the second memory 360. The appropriate second memory contents can be written to the newly reallocated cache memory segment. Thus, the old contents of the cache memory segment are discarded and replaced by the contents of the second memory 360 indicated in the read operation. The status of the newly reallocated cache memory segment remains "clean."

If there is insufficient clean cache available to satisfy the cachedread( ) request (i.e., all cache memory segments are designated as "dirty") the memory manager 320 can reallocate a segment of the dirty cache to hold a copy of the second memory contents indicated in the cachedread( ) operation. As part of the reallocation, the memory manager 320 issues an uncachedwrite( ) command to the cache user 350 to write back the contents of the dirty cache memory segment to the second memory 360. Once the dirty cache contents have been written back to the second memory 360, the memory manager 320 can copy the contents of the second memory indicated in the cachedread( ) command by issuing an uncachedread( ) call to the cache user 350. The status of the newly reallocated cache is set to "clean."

The memory manager 320 can allocate free memory 395 as cache memory 390 and reallocate both dirty and clean cache memory 390 to satisfy a cachedread( ) command. For example, if the memory manager 320 determines that a cachedread(512 MB,2 MB) method call results in a cache miss, and there is 1 MB of free memory and 512 KB of clean cache available, the memory manager 320 can allocate the 1 MB of free memory as cache memory 390, reallocate the 1 MB of clean cache, and reallocate 1 MB of dirty cache memory in order to service the cachedread( ) method call.

Regardless of whether the memory manager 320 reallocates dirty or clean cache to satisfy a cachedread( ) call, once the uncachedread( ) method has been executed by the cache user 350, the memory manager 320 returns the requested second memory contents to the cache user 350, which in turn returns the results to the calling component 330.

The memory system 300 can accommodate a write request from a mobile device component 330 in a similar fashion. A mobile device component 330 issues a write( ) method call to a cache user 350. In response, the cache user 350 issues a cachedwrite( ) command to the memory manager 320. The memory manager can determine whether a copy of the indicated second memory segment is present in the cache memory 390 (i.e., if there is a cache hit or miss). If there is a cache hit, the memory manager 320 writes the supplied data to the cache memory segment corresponding to the indicated second memory segment and changes the status of the cache memory segment from "clean" to "dirty."

If the indicated second memory contents are not located in cache memory 390 (i.e., there is a cache miss), the memory manager 320 can allocate unused memory 370 sufficient to satisfy the cachedwrite( ) operation. If sufficient free memory 395 is available, the memory manager 320 can allocate free memory 395 as cache memory 390 and write the supplied data to the just-allocated cached memory segment. If there is not enough free memory 395 available, the memory manager 320 can reallocate an amount of cache memory 390 sufficient to satisfy the cachedwrite( ) request. The reallocation can involve the reallocation of both clean and dirty cache, with the memory manager 320 reallocating clean cache before reallocating any dirty cache. As discussed above in detail in regard to the cachedread( ) operation, the allocation of sufficient unused memory 370 to satisfy a cachedwrite( ) request can comprise the allocation of free memory 395, and the reallocate of both clean and dirty cache memory.

If the size of a cache memory segment matches the size of data supplied in a cachedwrite( ) command, the cachedwrite( ) operation does not require the memory manager 320 to issue an uncachedwrite( ) call to the cache user 350 to copy second memory contents to the cache. This is because all of the contents of the cache memory segment can be overwritten with the write data. However, if there is a cache miss and the size of the newly allocated cache segment is larger than the write data, the memory manager 320 can perform an uncachedread( ) to copy the indicated second memory contents in the newly-allocated cached segment. This can be done to ensure that no second memory data is lost when the dirty cache segment is written back. For example, consider the situation where the memory manager 320 receives a cachedwrite( ) method call indicating that a 1 KB block of second memory 360 starting at second memory address 512 MB is to be written to, and the memory manager 320 determines that the cachedwrite( ) operation results in a cache miss. If the memory manager 320 is employing a cache management scheme that allocates cache memory in 2 KB segments, the memory manager 320 can allocate a 2 KB block of cache memory to accommodate the cachedwrite( ) request and access the second memory 360, via an uncachedread( ) operation, to fill the allocated cache memory segment with the 2 KB of second memory contents starting at second memory address 512 MB. This allows the second memory contents unaffected by the write operation (the 1 KB of second memory starting at second memory address 513 MB) to be preserved when the entire 2 KB block is written back to the second memory 360.

Once enough cache memory has been allocated to satisfy the cachedwrite( ) operation, and any second memory contents are copied into the cache memory, the memory manager 320 can perform the requested write operation by writing the indicated data to cache memory. The status of the cache memory segment written to is set to "dirty."

The memory manager 320 can be forced to write the contents of cache memory back to the second memory 360 by receiving a flush( ) method call issued by a component 330. The cache user 350 receiving a flush( ) method call from a component 330 can issue a flush( ) call to the memory manager 320. These flush( ) operations can be invoked by mobile device components 330, for example, on a periodic basis or asynchronously to synchronize the cache memory 390 with the second memory 360 to prevent against data loss resulting from a power outage or other events. Upon receipt of a flush( ) method call, the memory manager 320 can execute an uncachedwrite( ) command to write any dirty cache memory segments to the second memory 360.

Upon receipt of a malloc( ) method call, the memory manager 320 can allocate unused memory 370 as used memory 380 to satisfy the allocation request. The memory manager 320 can first determine whether there is sufficient free memory 395 available. If so, the memory manager 320 can allocate enough free memory 395 to service the allocation request. If there is not enough free memory 395 available, the memory manager 320 can reallocate sufficient cache memory 390 to service the malloc( ) command. Either clean or dirty cache memory can be reallocated as used memory. Before reallocating any cache memory segments designated as "dirty" as used memory 380, the memory manager 320 can issue uncachedwrite( ) commands to a cache user 350 to write the contents of any dirty cache memory segments to the second memory 360. Regardless of whether cache memory 390 or free memory 395 is allocated as used memory 380, the memory manager 320 sets the status of the affected first memory segments to "used."

In response to receiving a free memory, free( ) command, the memory manager 320 can reallocate used memory 380 as unused memory 370 and set the status of the reallocated first memory segments to "free."

FIGS. 4(a)-4(j) show memory maps of an exemplary first memory in a mobile device and the amount of used and unused first memory after execution of various memory operations. In this example, the first memory comprises 128 MB of memory and the mobile device has access to 8 GB of second memory, which can be an external hard drive, an SD card or the like.

FIG. 4(a) shows a first memory map 400 reflecting a mobile device state in which none of the 128 MB of first memory has been allocated as cache memory or for use by a mobile device component. All 128 MB of the first memory is designated as free memory.

FIG. 4(b) shows a first memory map 410 after a mobile device application has requested 32 MB of memory by issuing a malloc (32 MB) command. The mobile device manager has allocated the lowest 32 MB of first memory for use by the application and designated this 32 MB memory segment as "used." The upper 96 MB of first memory remains unused, free memory.

FIG. 4(c) shows a first memory map 420 after the execution of a read(1024 MB,32 MB) command issued by a mobile device application wishing to read the 32 MB of second memory starting at second memory address 1024 MB (1 GB). The application issued the read command to a cache user, which in turn issued a cachedread(1024 MB,32 MB) command to the memory manager. The memory manager allocated 32 MB of first memory starting at first memory address 32 MB as cache memory and issued an uncachedread(1024 MB,32 MB) method call to the cache user to read the 32 MB of second memory beginning at second memory address 1024 MB into the cache memory. The memory manager designated the allocated cache memory segment as "clean." Although 32 MB of unused memory was allocated as cache, the amount of unused memory available for allocation to mobile device applications and resources remains unchanged. After execution of the read( ) operation, there were 96 MB of unused memory (32 MB cache/64 MB free) and 32 MB of used memory.

FIG. 4(d) shows a first memory map 430 after the execution of two read commands and a memory allocation command issued by a mobile device application. The first read command, read(1040 MB,1 MB) issued to the cache user resulted in the cache user issuing a cachedread(1040 MB,1 MB) command to the memory manager. As the cache memory already contained the requested second memory contents, the memory manager performed the read operation and returned the contents to the cache user. The status of the cache memory segment read from remained "clean."

The second read command, read(2048 MB,32 MB) issued to the cache user resulted in the cache user issuing a cachedread(2048 MB,32 MB) command to the memory manager. The memory manager determined that a copy of the 32 MB of second memory beginning at address 2048 MB (2 GB) did not reside in cache memory (i.e., there was a cache miss) and allocated the 32 MB of free memory beginning at address 96 MB as cache memory in response to the cache miss. The memory manager then issued an uncachedread(2048 MB,32 MB) command to the cache user, which in turn read the 32 MB of second memory beginning at address 2048 MB. These second memory contents were then written to the 32 MB of first memory beginning at address 96 MB. The memory manager designated the newly allocated cache memory segment as "clean."

The memory allocation command, malloc(32 MB), resulted in the memory manager converting the 32 MB of first memory beginning at address 64 MB for use by the application, and changed the status of the allocated first memory segment from "free" to "used." After execution of the read( ) and malloc( ) operations, the size of the cache was dynamically increased from 32 MB to 64 MB, and there were 64 MB of unused memory (64 MB cache/0 MB free) and 64 MB of used memory. All of the unused memory has been allocated as cache memory.

FIG. 4(e) shows a first memory map 440 after the execution of a write(1040 MB,16 MB) command issued by an application to the cache user. The cache user in return issued a cachedwrite(1040 MB,16 MB) command to the memory manager in response to receiving the write(1040 MB,16 MB) method call. The memory manager determined that a copy of the 16 MB of second memory starting at address 1040 MB was stored in cache memory, beginning at first memory address 32 MB, wrote the 16 MB of write data to the cache memory, and changed the status of the first memory segment starting at address 32 MB from "clean" to "dirty." After execution of the write operation, there were 64 MB of unused memory (64 MB cache/0 MB free) and 64 MB of used memory.

FIG. 4(f) shows a first memory map 450 after the execution of a read operation issued by an application wishing to read the 16 MB of second memory starting at second memory address 4096 MB (4 GB). The read operation was performed by the application issuing a read(4096 MB,16 MB) operation to the cache user, which in turn issued a cachedread(4096 MB,16 MB) command to the memory manager. The memory manager determined that a copy of the requested segment of second memory was not in the cache memory and that there was insufficient free memory available to satisfy the cachedread( ) request. The memory manager selected the 16 MB of cache memory beginning at first memory address 112 MB for reallocation. As this segment of cache memory was designated as "clean," the memory manager did not write its contents back to second memory. The memory manager then issued an uncachedread(4096 MB,16 MB) command to load a copy of the requested second memory contents into the cache memory, and set the status of the reallocated cache memory segment to "clean." After execution of the read( ) operation, there were 64 MB of unused memory (64 MB cache/0 MB free) and 64 MB of used memory.

FIG. 4(g) shows a first memory map 460 after the execution of two write operations that resulted in all cache memory segments being designated as "dirty." The first write operation write(2048 MB,16 MB) issued by the application to the cache user resulted in the cache user issuing a cachedwrite (2048 MB,16 MB) command to the memory manager. The memory manager determined that the requested second memory contents were already in cache memory, wrote the write data to the appropriate cache segment block (the 16 MB first memory segment starting at address 96 MB), and changed the status of this memory segment to "dirty." The second write operation issued by the application, write(4096 MB,16 MB), was executed in a similar fashion, with the write data written to the 16 MB block of first memory starting at address 112 MB, and the status of this cache memory segment being set to "dirty." After execution of the two write operations, there were still 64 MB of unused memory (64 MB cache/0 MB free) and 64 MB of used memory.

FIG. 4(h) shows a first memory map 470 after the execution of a memory allocation operation issued by an application requesting the use of 16 MB of first memory. The application issued a malloc(16 MB) method call to the memory manager. The memory manager determined that there was 64 MB of unused memory available for allocation, that there was insufficient free memory and "clean" cache memory, and that a segment of "dirty" cache memory needed to be reallocated to service the malloc( ) request. The memory manager selected the 16 MB block of first memory beginning at address 32 MB for allocation, and issued an uncachedwrite(1024 MB,16 MB) to the cache user to write the contents of reallocated cache memory segment back to second memory. The memory manager then designated the reallocated first memory segment as "used." After execution of the free memory operation, the size of the cache memory was decreased from 64 MB to 48 MB, and there were 48 MB of unused memory (48 MB cache, 0 free) and 80 MB of used memory.

FIG. 4(i) shows a first memory map 480 after the execution of the free memory command free(16 MB) issued by an application to the memory manager. The memory manager freed up the lowest 16 MB of first memory, and set the status of this first memory segment to "free." After execution of the free memory operation, there were 64 MB of unused memory (48 cache/16 free) and 64 MB of used memory.

FIG. 4(j) shows a first memory map 490 after the execution of the memory allocation operation malloc(32 MB) issued by an application to the memory manager. The memory manager determined that 16 MB of free memory is available for allocation and that 16 MB of cache memory needed to be reallocated to accommodate the allocation request. The memory manager selected the 16 MB of "dirty" cache starting at first memory address 112 MB to be reallocated as used memory. The memory manager issued an uncachedwrite(4096 MB,16 MB) command to the cache user to write the contents of the cache memory segment to be reallocated back to the second memory. Upon completion of the write back operation, the memory manager allocated the 16 MB of free memory starting at first memory address 0, and reallocated the 16 MB block of first memory starting at address 112 MB for use by the calling application, and set the status of these two first memory blocks to "used." After execution of the memory allocation operation, there were 32 MB of unused memory (32 MB cache/0 free) and 96 MB of used memory.

Although the memory maps shown in FIGS. 4(a)-4(j) show contiguous free, used and cache memory segments, it is to be understood that it is not required that memory segments reside in contiguous blocks of physical memory. For example, the allocation of 32 MB of first memory shown in FIG. 4(j) resulted in multiple, non-contiguous first memory segments being allocated. Thus, although the allocated 32 MB memory segment appears to the application to be a single contiguous block of virtual memory, the 32 MB memory segment is not a contiguous block of physical memory.

Figure 5:
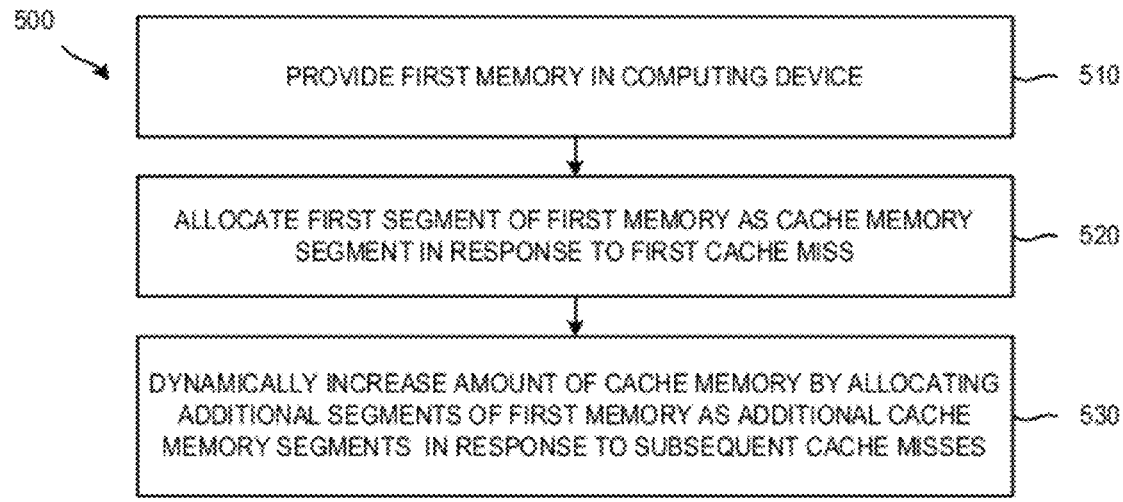
FIG. 5 is a flowchart of a first exemplary method of dynamically increasing the size of a cache memory allocated within a first memory of a computing device.

FIG. 5 is a flowchart of a first exemplary method 500 of dynamically increasing the size of a cache memory allocated within a first memory of a computing device. The method 500 can be performed by a mobile cell phone comprising embedded RAM and flash memories and executing a web browser application. At 510, a first memory in the computing device is provided that can be allocated as a cache memory or for use by the cell phone components. In the example, the embedded RAM is provided as the first memory and the embedded flash memory is a second memory. At 520, a first segment of the first memory is allocated as a segment of the cache memory in response to a first cache miss. In the example, the web browser issues a command to read from the flash memory. The cell phone determines that the flash memory contents indicated in the read command are not in the RAM, resulting in a cache miss. In response, the cell phone allocates a segment of the first memory as cache memory and copies the indicated flash memory contents into the cache. At 530, the size of the cache memory is dynamically increased by allocating additional segments of the first memory as additional segments of the cache memory in response to subsequent cache misses. In the example, the web browser application issues additional commands to read flash memory contents. The cell phone determines that one or more of these additional commands result in subsequent cache misses. In response to the subsequent misses, the cell phone allocates additional segments of the RAM as cache memory, thereby increasing the size of the cache memory, and copies the appropriate second memory contents into the embedded RAM.

In some embodiments, the method 500 can further comprise dynamically decreasing the size of the cache memory by reallocating a portion of the cache memory for use by the computing device components. For example, the web browser application can request that a portion of the first memory be allocated for use by the browser. In response, the cell phone can reallocate a portion of the RAM already allocated as cache memory in order to satisfy the memory allocation request, thereby decreasing the size of the cache memory. Thus, even when cache has been increased in size, the memory allocated as cache appears as unused memory to the device applications, and is available for use by the applications.

Figure 6:
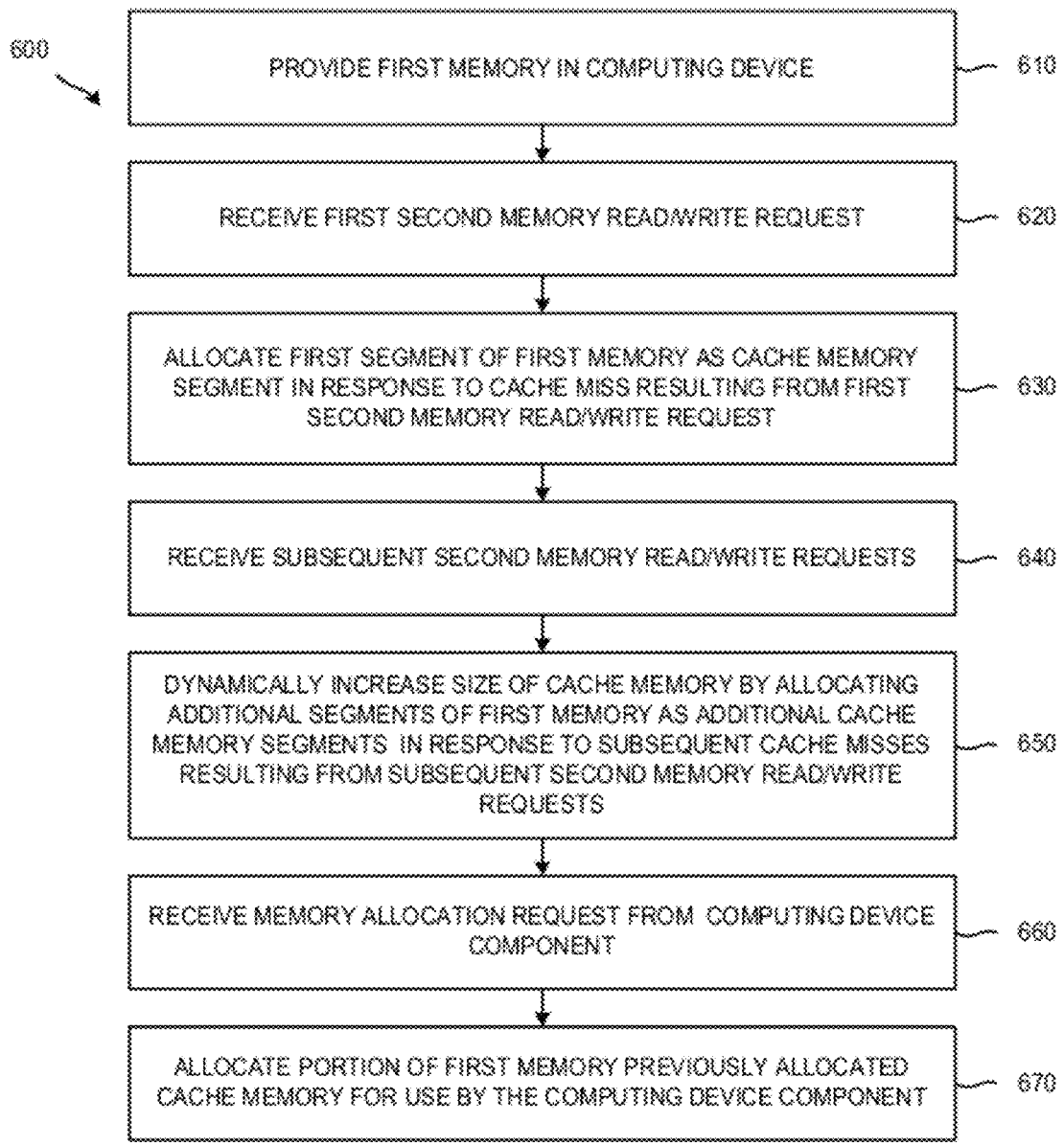
FIG. 6 is a flowchart of a second exemplary method of dynamically increasing the size of a cache memory allocated within a first memory of a computing device.

FIG. 6 is a flowchart of a second exemplary method 600 of dynamically increasing the size of a cache memory allocated within a first memory of a computing device. The method 600 can be performed by a laptop computer executing word processing and spreadsheet applications, containing embedded RAM and connected to an external hard drive. At 610, a first memory in the computing device is provided that can be allocated as a cache memory or for use by one or more computing device components. In the example, the RAM is provided as a first memory that can be allocated as a cache memory or for use by the various laptop applications. The external hard drive is a second memory. At 620, a first second memory read or write request is received from the one or more computing device components. In the example, a request from the word processing program to read from the hard drive is received. At 630, a first segment of the first memory is allocated as a segment of the cache memory in response to a first cache miss resulting from the first second memory read or write request. In the example, the laptop allocates a segment of the RAM as cache memory in response to the hard drive read request resulting in a cache miss. That is, the hard drive contents indicated in the read command had not previously been copied to the embedded RAM.

At 640, subsequent second memory read or write requests from the one or more computing device components are received. In the example, subsequent requests to read to and write from the hard drive are received from the word processing program. At 650, the size of the cache memory is dynamically increased by allocating additional segments of the first memory as additional segments of the cache memory in response to subsequent cache misses resulting from the subsequent second memory read or write requests. In the example, the laptop allocates additional RAM segments as cache memory in response to subsequent cache misses resulting from the subsequent hard drive read and write requests. At 660, a memory allocation request is received from one of the one or more computing device components. In the example, a memory allocation request is received from the spreadsheet application. At 670, a portion of the first memory previously allocated as segments of the cache memory is reallocated for use by the one of the one or more computing device components. In the example, the laptop reallocates a portion of the first memory previously allocated as cache memory segments for use by the spreadsheet application.

Any of the computer-executable instructions for implementing the disclosed techniques as well as any data created and used during implementation of the disclosed embodiments can be stored on one or more computer-readable media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatuses and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses.

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Having illustrated and described the principles of the illustrated embodiments, the embodiments can be modified in various arrangements while still remaining faithful to the concepts described above. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of managing memory of a computing device, the method comprising:
    providing a first memory in the computing device, wherein:
        at least an unused portion of the first memory can be used as a non-cache memory; and
        the first memory can be allocated as a cache memory or as a free memory for use by one or more computing device components, the cache memory being part of the unused portion of the first memory;
    allocating a first segment of the first memory as a segment of the cache memory in response to a first cache miss; and
    dynamically increasing the size of the cache memory within the unused portion of the first memory, by allocating additional segments of the first memory as additional segments of the cache memory in response to subsequent cache misses,
    wherein the cache memory appears as unused memory to the one or more computing device components, so that the dynamically increasing the size of the cache memory does not decrease an amount of the first memory available to the one or more computing device components.

2. The method of claim 1, wherein portions of the first memory are allocated as either for use by the one or more computing device components or as segments of the cache memory.

3. The method of claim 1, further comprising dynamically decreasing the size of the cache memory by reallocating a portion of the cache memory for use by the one or more computing device components.

4. The method of claim 1, wherein the computing device is a mobile device.

5. The method of claim 1, wherein the cache memory is a cache memory for a second memory accessible to the computing device.

6. The method of claim 5, wherein the first memory comprises non-removable RAM (random-access memory) and the second memory comprises non-removable flash memory.

7. The method of claim 5, wherein the first memory comprises non-removable memory and the second memory comprises removable memory or external memory.

8. The method of claim 1, wherein the first cache miss or any of the subsequent cache misses results from a second memory read or write request issued by the one or more computing device components.

9. The method of claim 8, wherein a cache user receives the second memory read or write request, the method further comprising the cache user issuing a cache memory read or write request.

10. A computing device, comprising:
    a first memory that is dynamically allocable and reallocable as a cache memory within an unused portion of the first memory or for use by one or more computing device components as a non-cache memory; and
    a memory manager that:
        allocates a first segment of the first memory as a segment of the cache memory in response to a first cache miss; and
        dynamically increases the size of the cache memory by allocating additional segments of the first memory as additional segments of the cache memory in response to subsequent cache misses,
        wherein the cache memory appears as unused memory to the one or more computing device components, so that dynamically increasing the size of the cache memory by the memory manager does not decrease an amount of the first memory available to the one or more computing device components.

11. The computing device of claim 10, wherein portions of the first memory are allocated as either for use by the one or more computing device components or as segments of the cache memory.

12. The computing device of claim 10, wherein the memory manager dynamically decreases the size of the cache memory by reallocating a portion of the cache memory for use by the one or more computing device components.

13. The computing device of claim 10, wherein the computing device is a mobile device.

14. The computing device of claim 10, wherein the cache memory is a cache memory for a second memory accessible to the computing device.

15. The computing device of claim 14, wherein the first memory comprises non-removable RAM and the second memory comprises non-removable flash memory.

16. The computing device of claim 14, wherein the first memory comprises non-removable memory and the second memory comprises removable memory or external memory.

17. The computing device of claim 10, wherein the first cache miss or any of the subsequent cache misses results from a second memory read or write request issued by the one or more computing device components.

18. The computing device of claim 17, further comprising a cache user that receives the second memory read or write request and issues a cache memory read or write request.

19. One or more computer-readable storage media storing computer-executable instructions for causing a computing device to perform a method, the method comprising:
    providing a first memory in the computing device, wherein at least a portion of the first memory can be used as a non-cache memory, and the first memory can be allocated as a cache memory within an unused portion of the first memory or for use by one or more computing device components;
    receiving a first second memory read or write request from the one or more computing device components;
    allocating a first segment of the first memory as a segment of the cache memory in response to a first cache miss resulting from the first second memory read or write request;
    receiving subsequent second memory read or write requests from the one or more computing device components;
    dynamically increasing the size of the cache memory by allocating additional segments of the first memory as additional segments of the cache memory in response to subsequent cache misses resulting from the subsequent second memory read or write requests;
    receiving a memory allocation request from one of the one or more computing device components; and allocating a portion of the first memory previously allocated as segments of the cache memory for use by the one of the one or more computing device components, wherein the cache memory appears as unused memory to the one or more computing device components, so that the dynamically increasing the size of the cache memory does not decrease an amount of the first memory available to the one or more computing device components.

* * * * *